United States Patent
Jensen et al.

(10) Patent No.: US 9,362,751 B2
(45) Date of Patent: Jun. 7, 2016

(54) METHOD OF CONTROLLING THE POWER INPUT TO A HVDC TRANSMISSION LINK

(71) Applicant: SIEMENS AKTIENGESELLSCHAFT, München (DE)

(72) Inventors: Kim Hoej Jensen, Faxe (DK); Ranjan Sharma, Bagsvaerd (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 625 days.

(21) Appl. No.: 13/676,337

(22) Filed: Nov. 14, 2012

(65) Prior Publication Data
US 2013/0128630 A1    May 23, 2013

(30) Foreign Application Priority Data

Nov. 23, 2011 (EP) .................. 11190274

(51) Int. Cl.
*H02J 1/00* (2006.01)
*H02J 3/00* (2006.01)
(Continued)

(52) U.S. Cl.
CPC . *H02J 3/36* (2013.01); *H02H 7/268* (2013.01); *Y02E 60/60* (2013.01)

(58) Field of Classification Search
CPC ............ H02J 3/36; H02H 7/268; Y02E 60/60
USPC .......................................................... 307/82
See application file for complete search history.

(56) References Cited

U.S. PATENT DOCUMENTS 5,270,640 A * 12/1993 Kohler et al. ............ 324/765.01
2002/0008982 A1   1/2002 Jiang-Hafner
(Continued)

FOREIGN PATENT DOCUMENTS

CN      101479910 A    7/2009
CN      101682192 A    3/2010
(Continued)

OTHER PUBLICATIONS

Enhanced Fault Ride-Through Method for Wind Farms Connected to the Grid Through VSC-Based HVDC Transmission; Christian Feltes et al: "Enhanced Fault Ride-Through Method for Wind Farms Connected to the Grid Through VSC-Based HVDC Transmission", IEEE Transactions on Power Systems, IEEE Service Center, Piscataway, US, vol. 23, No. 3, Aug. 1, 2009, pp. 1537-1546, XP011264397; 2009; Aug. 1, 2009.
(Continued)

*Primary Examiner* — Rexford Barnie
*Assistant Examiner* — Toan Vu

(57) ABSTRACT

Disclosed is a method of controlling the power input to a HVDC transmission link, which HVDC transmission link is connected to an AC power plant via a first voltage source converter and to AC grid via a second voltage source converter, which method includes using the second voltage source converter to perform voltage control of the HVDC transmission link during a no-fault mode of operation of the grid; monitoring a HVDC transmission link parameter to detect an unbalanced fault; and using the first voltage source converter to regulate the output of the AC power plant on the basis of the monitored HVDC transmission link parameter in the event of an unbalanced fault. Also described are a control module for controlling the power input to a HVDC transmission link; a voltage source converter for a power plant; and a power generation and transmission arrangement.

9 Claims, 5 Drawing Sheets

(51) Int. Cl.
*H02J 3/36* (2006.01)
*H02H 7/26* (2006.01)

(56) References Cited

U.S. PATENT DOCUMENTS

| | | | |
|---|---|---|---|
| 2009/0279328 A1* | 11/2009 | Jiang-Hafner | 363/35 |
| 2010/0052322 A1* | 3/2010 | Fortmann | F03D 7/0272 290/44 |
| 2010/0085783 A1* | 4/2010 | Jiang-Hafner | H02M 5/4505 363/35 |
| 2011/0163113 A1* | 7/2011 | Grubbs et al. | 221/311 |
| 2012/0203385 A1* | 8/2012 | Kumar | H02J 3/26 700/287 |
| 2012/0205981 A1* | 8/2012 | Varma et al. | 307/64 |

FOREIGN PATENT DOCUMENTS

| | | | |
|---|---|---|---|
| JP | 2003037939 A | | 2/2003 |
| WO | WO2011032265 | * | 3/2011 |
| WO | WO 2011032265 A1 | | 3/2011 |

OTHER PUBLICATIONS

AC Fault Ride-Through Capability of a VSC-HVDC Transmission Systems; G. P. Adam et al: "AC Fault Ride-Through Capability of a VSC-HVDC Transmission Systems", Energy Conversion Congress ans Expostion, 2010 IEEE, Piscataway, USA, Sep. 12, 2010, pp. 3739-3745, XP031787005; 2010; Sep. 12, 2012.

* cited by examiner

METHOD OF CONTROLLING THE POWER INPUT TO A HVDC TRANSMISSION LINK

CROSS REFERENCE TO RELATED APPLICATIONS

This application claims priority of European Patent Office application No. 11190274.8 EP filed Nov. 23, 2011. All of the applications are incorporated by reference herein in their entirety.

FIELD OF INVENTION

The disclosure describes a method of controlling the power input to a HVDC transmission link. The disclosure further describes a control module for controlling the power input to a HVDC transmission link, and a power supply arrangement.

BACKGROUND OF INVENTION

Initially, offshore power plants such as offshore wind parks for generating multi-phase AC power were connected to an on-shore grid over a high-voltage alternating current (HVAC) transmission link. However, developments in the field of high-voltage direct-current (HVDC) transmission are making it more likely that, in future, more offshore wind power plants will be connected to a main grid over a HVDC transmission connection.

To feed into a collector network, the AC power (usually three-phase) of a wind turbine or other generator generally undergoes an AC-DC conversion and then a DC-AC conversion before being fed into the collector network via a transformer. These steps can be performed by a converter or voltage source converter (VSC), generally comprising semiconductor power switches such as isolated gate bi-polar transistors (IGBTs) and gate control circuits. At a point of common connection (PCC) in the collector network, the AC power is fed into a VSC for AC-DC conversion prior to transmission over the HVDC link. At the other end, another VSC converts the DC power into multi-phase (usually three-phase) AC power for feeding into the grid.

A fault occurring at the grid end can either be symmetrical (i.e. the voltage in all phases collapses evenly) or asymmetrical (only one or two voltage phases collapse). A symmetrical fault is usually referred to as a "low voltage fault", while an asymmetrical fault is generally referred to as a "single line-to-ground fault". Asymmetrical faults are the most common types of fault that occur in multi-phase (usually three-phase) power transmission systems. The ability to quickly recover from an asymmetrical fault and to resume normal operation is usually a grid requirement. Also, most grid requirements specify that a power plant should be able to stay connected to the grid during a short-term fault and to continue supplying reactive power for the duration of the fault, and for this reason, a power plant is usually designed with a "fault-ride-through" mechanism.

When an asymmetrical fault occurs at the grid side of a HVDC system, the active power consumed by the grid will decrease, while the power plant continues to generate active power. In order to stay connected to the grid during the fault, the excess active power—manifesting as an excess DC voltage—must be dealt with in some way at the power plant side. The most common way of handling the problem of excess DC voltage is by dissipating the excess active power using a DC chopper. For example, the increase in DC voltage can be controlled by loading a power resistor while the power plant continues to produce active power as it did before the asymmetrical fault occurred, so that the active power transferred to the grid is reduced. This means that the power plant can continue to operate regardless of the disturbance at the other end of the HVDC transmission line. However, including a DC chopper adds to the cost of a wind park, particularly in the case of a large wind park comprising many wind turbines, and is inefficient from an energy conservation point of view, since great effort and cost must be invested in efficient heat sinks for cooling the DC chopper.

In a HVDC transmission arrangement, a power plant is effectively de-coupled from the main grid. Therefore, an AC disturbance such as an asymmetrical fault occurring at the main grid will not be directly "seen" by the wind power plant. In an alternative approach, the decrease in active power transfer to the grid is measured and passed on to the power plant using communication signals. For example, in the case of a wind power plant with a plurality of wind turbines, the individual wind turbines will receive new power setpoints relating to a lower production, in order to obtain a new power balance until the system has recovered from the fault. However, the disadvantage of this approach is that it takes relatively long time for the power plant to react to the asymmetrical fault, since the asymmetrical fault must first be communicated in some way to the power plant over a communications interface, and it takes a correspondingly longer time for the situation to stabilize.

SUMMARY OF INVENTION

An improved way of responding to an asymmetrical fault in a system comprising a HVDC transmission line is provided by the disclosure via a method of controlling the power input to a HVDC transmission link; via a control module for controlling the power input to a HVDC transmission link; via a voltage source controller and via a power generation and transmission system.

The method of controlling the power input to a HVDC transmission link—which HVDC transmission link is connected at one end to an AC power plant by means of a first voltage source converter and at the other end to an AC grid by means of a second voltage source converter—comprises using the second voltage source converter to perform voltage control of the HVDC transmission link during a no-fault or "normal" mode of operation of the grid; monitoring a HVDC transmission link parameter to directly detect an unbalanced fault; and using the first voltage source converter to regulate the output of the AC power plant on the basis of the monitored HVDC transmission link parameter in the event of an asymmetrical or unbalanced fault.

Unlike the known types of fault-ride-through approaches, the method does not need to rely on data communication to convey information regarding the asymmetrical fault from the grid side to the power plant side. In the method, the fault event is detected directly at the power plant side using the HVDC transmission link parameter, i.e. a physical measurable signal. In other words, the method may detect and respond to an asymmetrical fault directly and without requiring any communications signals for reporting the fault to the power plant. Thus providing a very fast and reliable response is desirable for a fault-ride-through sequence.

The control module for controlling the power input to a HVDC transmission link, which HVDC transmission link is connected to a power supply by means of a first voltage source converter and to a grid by means of a second voltage source converter, comprises a monitoring means for monitoring a HVDC transmission link parameter; a detecting means for directly detecting an unbalanced fault on the basis of the monitored HVDC transmission link parameter; and a regulating means for regulating the output of the AC power plant according to the monitored HVDC transmission link parameter.

The control module may be used detect a fault at either end or side of the HVDC transmission link, so that it is not necessary to implement two different detection and control modules for a grid-side asymmetric fault (e.g. occurring in the main grid) and a power plant asymmetric fault (e.g. occurring in the power plant's collector network). In both cases, the generators of the power plant can be compelled to respond directly to the change in the monitored HVDC transmission link parameter.

The voltage source converter for a power plant comprises such a control module. Therefore, the monitoring means may be arranged close to the HVDC transmission link (in electrical terms), so that an accurate and therefore temporally relevant value of the HVDC transmission link parameter can be obtained.

The power generation and transmission arrangement comprises an AC power plant for generating AC power; an AC grid (3) for consuming the generated AC power; a HVDC transmission link (2) for transmitting the generated power from the AC power plant to the AC grid; a first voltage source converter for converting AC power into DC power, arranged between a collector network of the AC power plant and the HVDC transmission link; a second voltage source converter for converting DC power into AC power, arranged between the HVDC transmission link and the AC grid; and a control module for controlling the power input to the HVDC transmission link.

Particularly embodiments and features are provided by the dependent claims. Features of different claim categories may be combined as appropriate to give further embodiments not described herein.

In the following, it may be assumed that the fault does not occur simultaneously on all phases of a multi-phase network, but instead occurs on only a few phases of a multi-phase network, for example on one phase of a three-phase network. IN the following, without restricting the invention in any way, it may be assumed that the power plant generates three-phase AC power, and that the grid consumes three-phase AC power.

Also, in the following, the terms "converter" or "voltage source converter" (VSC) have the same meaning and may be used interchangeably.

The power plant can comprise any kind of AC power plant that feeds power into a HVDC transmission link. The method is suited for application in a power plant such as a tidal power plant or a wind power plant for which the transmission system is based on voltage source converters. In the following, for the sake of simplicity, it may be assumed that the power plant comprises a wind power plant (WPP), for example an offshore wind power plant connected to a grid by means of HVDC transmission link arranged, for example, on the seabed.

Such a WPP comprises a plurality of variable-speed wind turbines. For example, the variable-speed wind turbines of such a wind power plant can be doubly-fed machines or full-converter machines, with or without a gearbox. A variable-speed wind turbine may be realized to exhibit zero negative sequence current control, so that the wind turbine may provide a balanced multi-phase current regardless of a voltage imbalance in the collector network of the WPP.

When an asymmetric fault occurs, for example one phase goes to ground at the grid side of the transmission link, the second converter or grid-side VSC responds by increasing the active current to the grid in an attempt to maintain the power balance. This can succeed as long as the increase in current remains within the limits of the converter, in which case a power balance can be achieved and the DC voltage is maintained. However, the instantaneous AC active power can start to oscillate at a second harmonics frequency that is twice the grid voltage fundamental frequency—100 Hz for a 50 Hz system). Since the active power in the AC side and the DC side needs to be equal (except for the converter losses), as a result of AC active power oscillation, the DC voltage at the grid side of the HVDC transmission link will also start to oscillate.

However, in most cases, the instantaneous AC active power delivered to the grid by the grid-side VSC drops on account of the asymmetrical fault, whereby the amount of decrease is limited by the current-limiting properties of the grid-side VSC. Once this limit is reached, the grid-side VSC can effectively no longer control the DC voltage of the HVDC transmission link. As a consequence, this DC voltage over the HVDC transmission link increases.

The method makes use of this fact, and teaches the "transfer" of control of the HVDC transmission link DC voltage to the power-plant side VSC or first converter. In an embodiment, an unbalanced fault is detected in the first converter when the monitored HVDC transmission link parameter exceeds a predefined threshold value. Any parameter that provides the pertinent information could be monitored. In an embodiment, since a voltage is relatively easy to measure and may be measured effectively instantaneously, the monitored HVDC transmission link parameter comprises a HVDC transmission link voltage. In the following, therefore, it may be assumed that the monitored parameter is a voltage. To obtain a most informative and accurate value of the monitored voltage, the voltage may be monitored in the first converter at a location favorably close—in electrical terms—to the transmission line.

The transmission line itself, which can be in the order of 100 km in length or more, will of course have an inherent impedance. Therefore, in an embodiment, the monitored HVDC transmission link voltage is adjusted to account for such a line impedance.

Grid code requirements stipulate that the entire system, including the HVDC transmission link and the power plant, should remain connected during the fault. In the prior art techniques, this is only possible by dissipating the extra power, usually in a DC chopper. In contrast, in the method according, the output of the AC power plant is regulated according to the monitored HVDC transmission link voltage. For example, the AC power plant output, i.e. the AC power in the collector network or at the point of common connection, can be regulated in proportion to the amount by which the monitored HVDC transmission link voltage exceeds the threshold value. In an embodiment, however, the step of regulating the output of the AC power plant comprises the step of providing unbalanced multi-phase signals at a collector network of the AC power plant. For example, in a three-phase power plant, the three phases of the AC voltage at the collector network can be regulated to have different or "unbalanced" magnitudes. This imbalance in phase voltages will compel or force the wind turbines of the WPP to react by lowering their active current fed into the collector network.

Therefore, in an embodiment, the regulating means of the control module is realized to generate an unbalanced three-phase AC voltage reference at the collector network of the AC power plant, whereby the unbalanced AC voltage reference comprises three voltage signals of different magnitudes. Each variable-speed wind turbine already has unbalanced control, so each wind turbine may respond accordingly by, for example, increasing the rotor speed, altering the pitch angle, increasing rotor torque, etc., so that the energy is effectively stored in each wind turbine as long as conditions in the AC collector network are unbalanced. For example, the excess of active power can be stored in the rotating mass of the wind turbine blades as they speed up. Once the fault has been repaired, the first controller resumes normal operation and provides balanced conditions in the AC controller network, whereupon the wind turbines can release the stored energy in a controlled manner back into the collector network.

BRIEF DESCRIPTION OF THE DRAWINGS

Other objects and features will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

In the diagrams, like numbers refer to like objects throughout. Objects in the diagrams are not necessarily drawn to scale.

Figure 1:
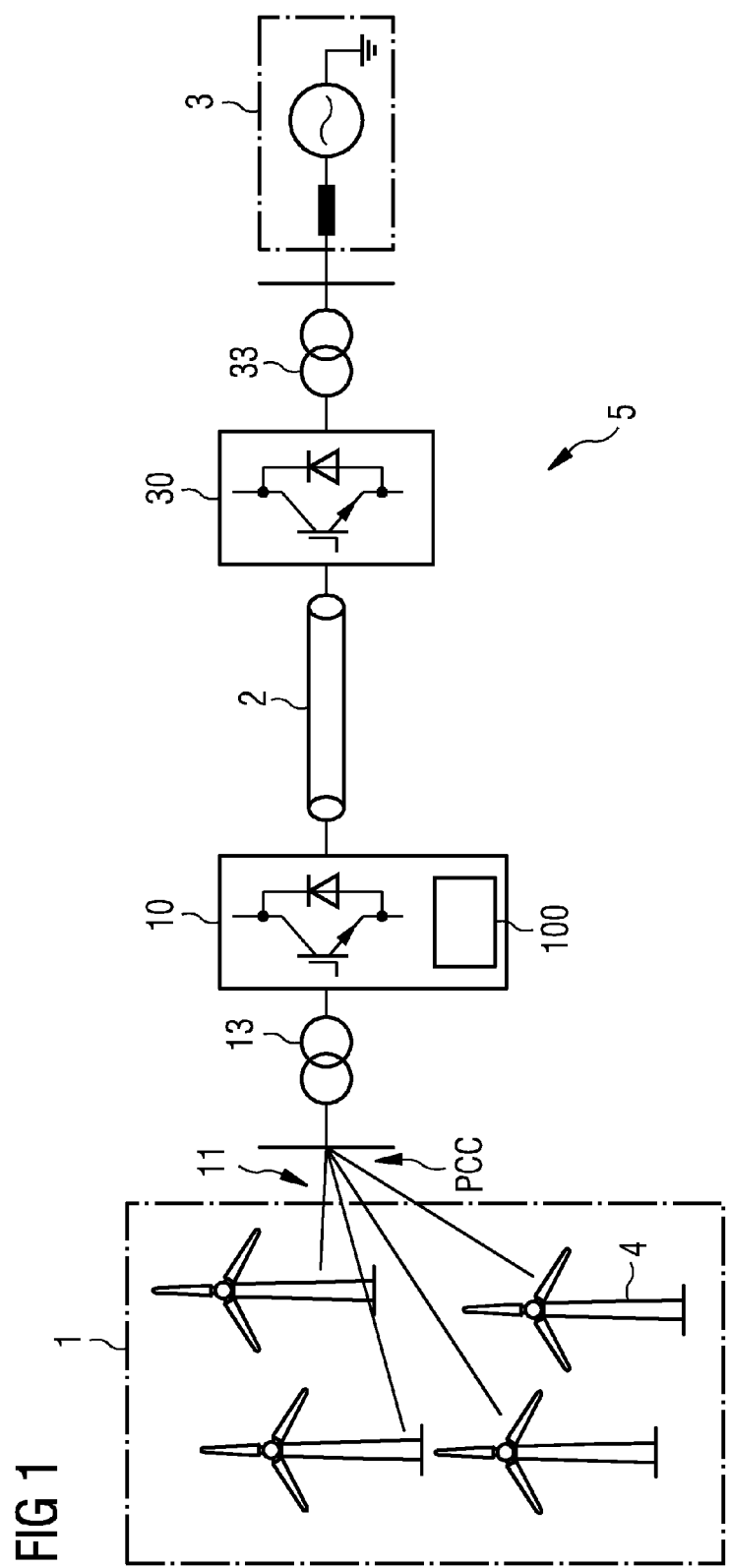
FIG. 1 shows a power generation and transmission system.

FIG. 1 shows a power generation and transmission system 5. In this embodiment, a plurality of variable-speed wind turbines 4 of a wind park 1 feed their AC output power into a collector network 11 at a point of common connection PCC. The collector network 11 in turn is connected via a transformer 13 and a first converter 10 or first VSC 10 to a bi-polar HVDC transmission link 2.

At the other end of the HVDC transmission link 2, a second converter 20 or second VSC 20 converts the DC power into AC power and feeds this via a transformer 33 into an AC grid 3 for consumption.

During normal "no-fault" operation, the variable-speed wind turbines 4 produce active power as determined by the wind velocity. A variable-speed wind turbine 4 can be realized with or without a gearbox, and is realized to feed its AC output into the collector network 11. The output of the wind turbines 4 of the wind park 1 is "collected" at the point of common connection PCC. The controller of such a variable-speed wind turbine adjusts its output according to the level of the AC voltage at the point of common connection.

At the point of common connection PCC, the first converter absorbs the active power from the wind power plant 1 and transforms it into DC, while maintaining constant levels for the AC voltage and frequency at the point of common coupling. At the other end of the HVDC transmission line 2, the second converter 20 transforms the active power from DC into AC, maintaining the DC voltage balance.

The second converter 20 is a current-limited converter 20, so that, if a single line-to-ground fault should occur at the grid side—i.e. one of the three phases goes to ground—the DC voltage in the HVDC transmission link 2 will increase significantly.

The first converter 10 comprises a control module 100 for regulating the power input to the HVDC transmission link 2 during such a single line-to-ground fault using the method.

Figure 2:
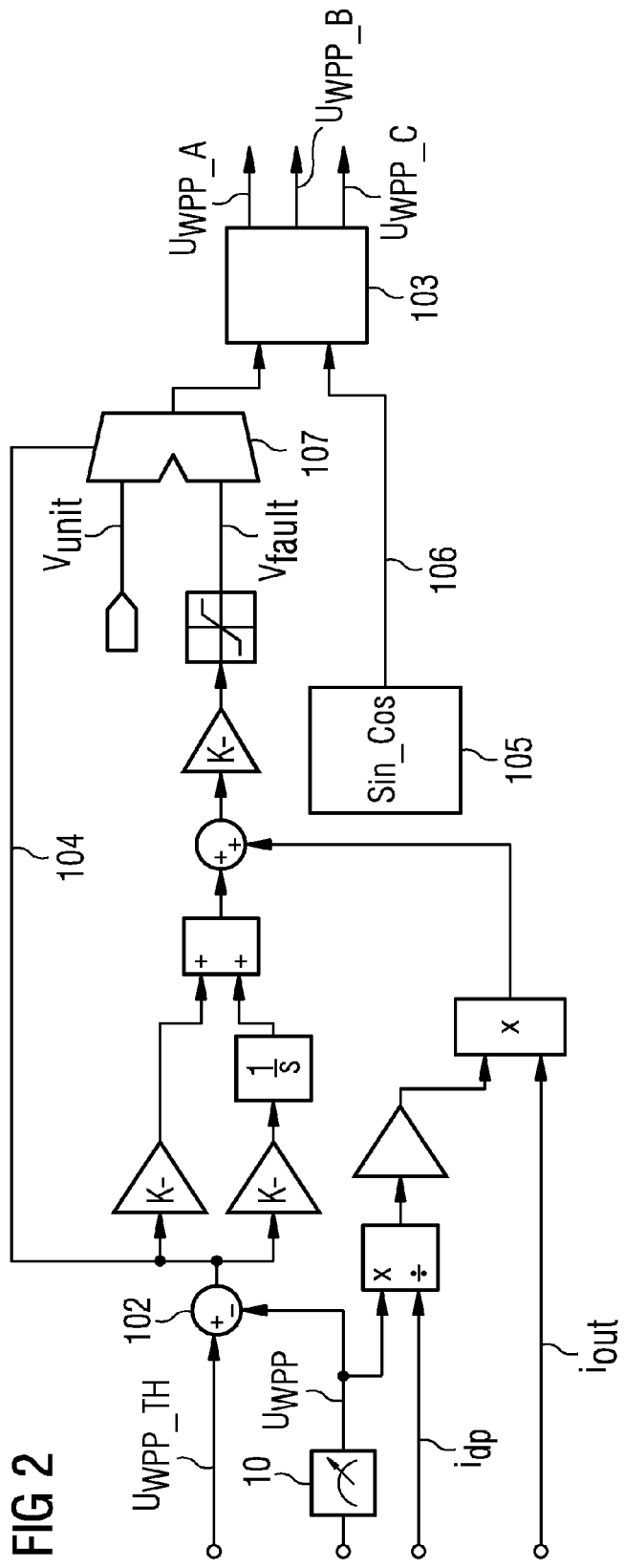
FIG. 2 shows a block diagram of a control module.

FIG. 2 shows a block diagram of a control module 100. The control module 100 can be realized as a collection of software algorithms to carry out the steps of the control method, and the functional steps are illustrated here for simplicity in the form of a block diagram.

During operation, the HVDC transmission link voltage $U_{WPP}$ is measured in a monitoring means 101, for example a voltmeter 101, at a point electrically close to the HVDC transmission link 2. This measured value $U_{WPP}$ is compared to a reference value $U_{WPP\_TH}$ in a detecting means 102 for directly detecting an unbalanced fault. For example, if the measured value $U_{WPP}$ exceeds the reference or threshold value $U_{WPP\_TH}$, this is interpreted to mean that a single-line-to-ground fault has occurred in the grid side. During a single line-to-ground fault, then, an appropriate signal 104 and a switching means 107 is used to replace a unit voltage reference signal $v_{unit}$ by a modified voltage reference signal $v_{fault}$ derived from the monitored HVDC transmission link parameter $U_{WPP}$, so that a regulating means 103 can regulate the output of the AC power plant 1 according to the monitored HVDC transmission link parameter $U_{WPP}$. The regulating means 103 in this embodiment receives a sinusoidal signal 106 as input from a phase-locked loop 105, and modulates the amplitudes of the three AC voltage signals $U_{WPP\_A}$, $U_{WPP\_B}$, $U_{WPP\_C}$ of the collector network 11, as will be explained with the aid of FIG. 3 below.

This diagram is a block representation of the following control equation, which is performed for each phase of the output:

$$v_{dp}^r(n) = \frac{2}{3} \cdot \frac{v_{dc}(n)}{i_{dp}(n)} \cdot \frac{C_{dc}}{T_s} \cdot \left(v_{dc,FRT}^r(n) - v_{dc}(n) + \frac{2}{3} \cdot \frac{v_{dc}(n)}{i_{dp}(n)} \cdot i_{out}(n)\right)$$

In which the superscript "r" denotes a reference value; $V_{dc}$ is the measured HVDC voltage, corresponding to the measured value $U_{WPP}$ mentioned in the diagram; $V^r_{dc}$ is the reference DC voltage, corresponding to the reference or threshold value $U_{WPP\_TH}$ mentioned in the diagram; $i_{dp}$ is the positive sequence d-axis current measured at the AC side of the WPP side VSC; $i_{out}$ is the output DC side current measured after a DC capacitor of the VSC 10; $C_{dc}$ is the DC capacitance; $T_s$ is the sampling time, and "n" is the sample number. The result of the control equation is a regulated AC output phase voltage magnitude $V^r_{dp}$, corresponding to the three AC voltage signals $U_{WPP\_A}$, $U_{WPP\_B}$, $U_{WPP\_C}$ for the collector network 11.

The envelope of an output voltage phase is therefore not constant as would be case for the normal or no-fault state, but instead is dynamically modulated according to the changing amplitude of the oscillating DC grid voltage $v_{dc}$. These unbalanced voltages are "seen" by each variable-speed wind turbine 4, and each turbine 4 reacts accordingly to the imbalance, for example by increasing the rotor speed, changing the pitch angle, etc., so that energy is "accumulated" or stored in the wind turbine for a later controlled release into the collector network 11 when fault recovery is complete.

In a no-fault situation, a unit voltage reference $v_{unit}$ is used instead of the oscillating DC grid voltage $V_{dc}$ (i.e. $U_{WPP}$), so that the regulating means 103 generates three balanced AC output voltage signals $U_{WPP\_A}$, $U_{WPP\_B}$, $U_{WPP\_C}$ with a constant envelope, i.e. three signals of equal magnitude.

Figure 3:
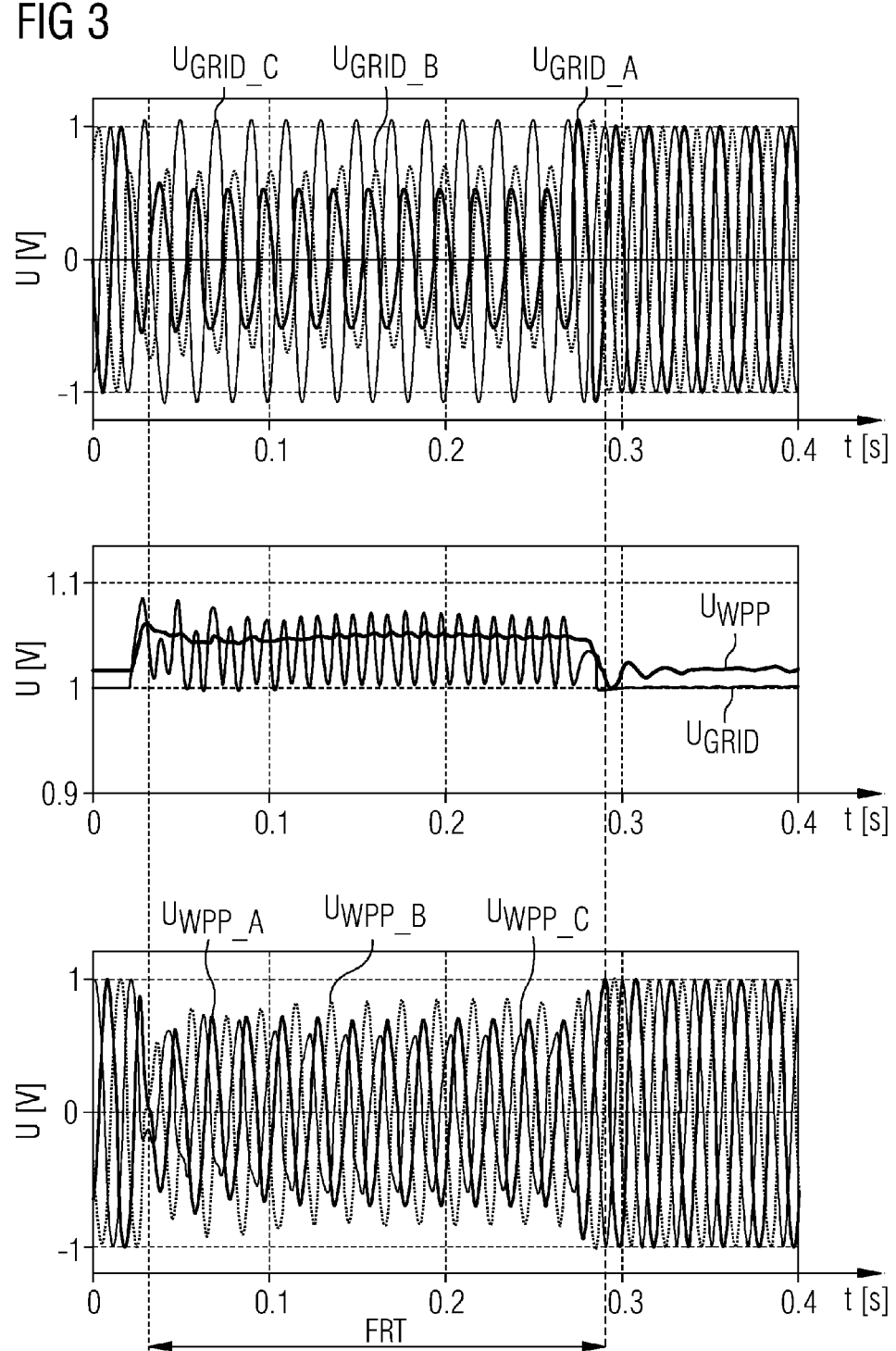
FIGS. 3, 4 and 5 show graphs of voltage, current and power respectively during control of a HVDC transmission link using the method during and after an asymmetrical grid-side fault.

FIG. 3 shows graphs of simulated "per unit" voltage during and after an asymmetrical grid-side fault arising during control of a HVDC transmission link using the method.

The upper plot in the diagram shows the development in AC voltage level $U_{GRID\_A}$, $U_{GRID\_B}$, $U_{GRID\_C}$ for the three phases at the grid side. These AC voltages $U_{GRID\_A}$, $U_{GRID\_B}$, $U_{GRID\_C}$ are measured at the HVDC-side of the grid transformer 33 in FIG. 1.

The centre plot in the diagram shows the development in DC voltage level $U_{GRID}$, $U_{WPP}$ in the HVDC transmission link measured close to the grid end and the wind power plant end of the HVDC transmission link 2 respectively. The difference in magnitude is explained by the inherent cable impedance of the HVDC transmission link 2.

The lower plot in the diagram shows the development in AC voltage level $U_{WPP\_A}$, $U_{WPP\_B}$, $U_{WPP\_C}$ for the three phases at the wind power plant side, i.e. measured at the point of common connection PCC.

A single line-to-ground fault occurs at about 0.03 s. Almost immediately, the regulating means 103 provides the unbalanced AC voltages $U_{WPP\_A}$, $U_{WPP\_B}$, $U_{WPP\_C}$. Because of the current limitation of the second converter 20, the grid-side DC voltage $U_{GRID}$ rises sharply and starts to oscillate at double the grid frequency, e.g. at 100 Hz for a 50 Hz grid. The increase in grid-side DC voltage $U_{GRID}$ causes an increase in the DC voltage level $U_{WPP}$ at the wind power plant end of the transmission line 2, and this is detected by the detecting means 102 in the control module 100 of the first converter 10, which then assumes control of the power input to the transmission link. The regulating means 103 starts to modulate the AC voltages $U_{WPP\_A}$, $U_{WPP\_B}$, $U_{WPP\_C}$ to force the wind turbines to react, as explained above with the block diagram of FIG. 2.

At about 0.29 s, fault recovery at the grid side is completed, so that the second converter 10 can operate within its current limits, and can resume control of the DC voltage of the HVDC transmission link 2. As a result, the DC voltage levels $U_{GRID}$, $U_{WPP}$ in the HVDC transmission link return to their pre-fault normal levels, and the regulating means 103 of the control module 100 in the first converter 10 uses the unit voltage reference to provide three balanced voltage references, with equal magnitudes, once more. Again, these balanced voltages are "seen" by the wind turbines 4, which react accordingly.

Figure 4:
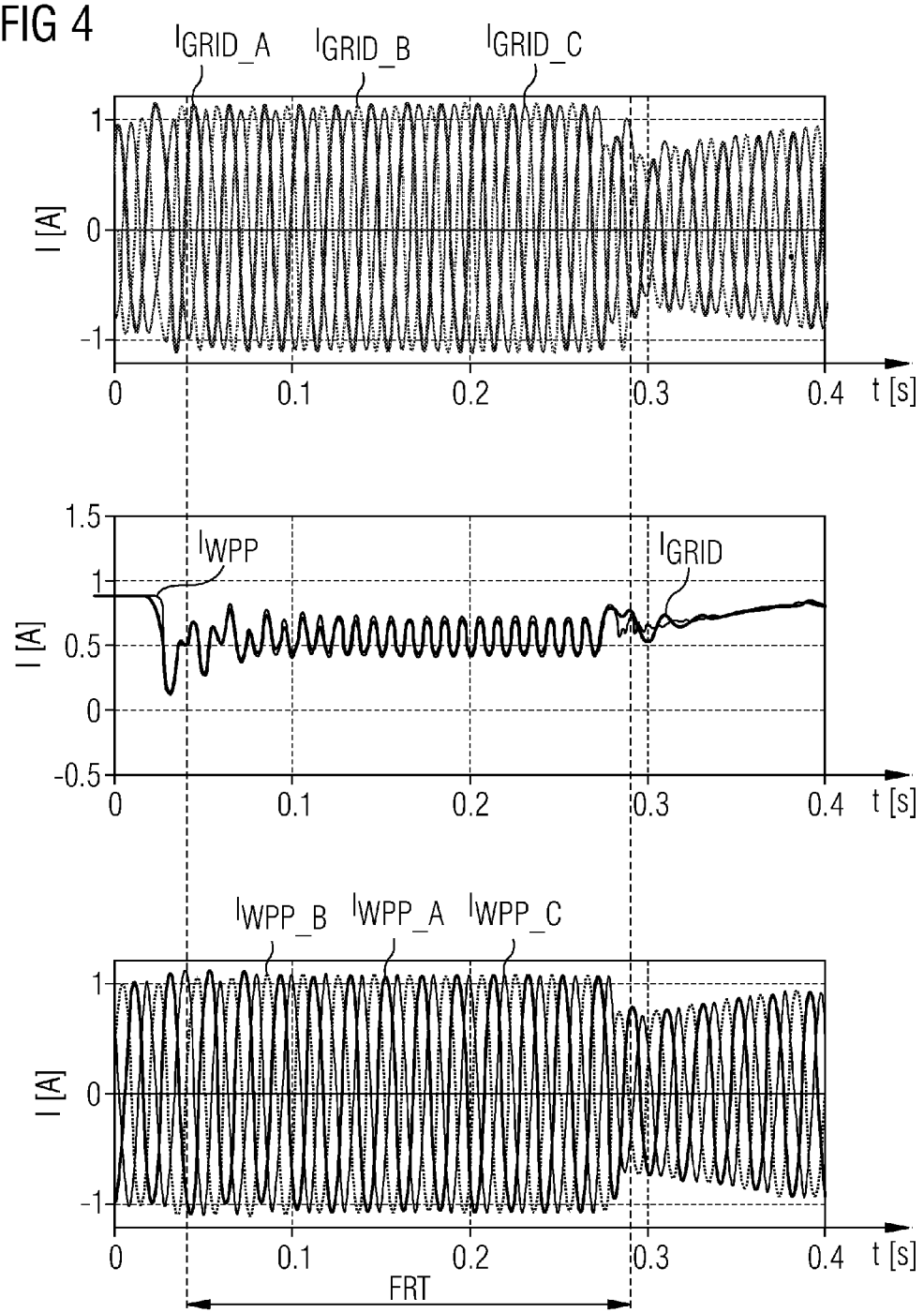

The first converter 10, running the control method, uses the oscillating voltage $U_{WPP}$ (and therefore also oscillating power) over the DC transmission link 2 to draw equivalent oscillating power from the power plant 1, resulting in an unbalanced AC voltage at the PCC. However, the wind turbines 4 will only feed balanced current into the system, as illustrated in FIG. 4, which shows graphs of "per unit" current at the grid, over the HVDC transmission link, and at the PCC during and after that asymmetrical grid-side fault. The upper plot in the diagram shows the development in AC current level $I_{GRID\_A}$, $I_{GRID\_B}$, $I_{GRID\_C}$ for the three phases at the grid side. These AC currents $I_{GRID\_A}$, $I_{GRID\_B}$, $I_{GRID\_C}$ are measured at the HVDC-side of the grid transformer 2 in FIG. 1.

The centre plot in the diagram shows the development in DC current $I_{GRID}$, $I_{WPP}$ in the HVDC transmission link measured close to the grid end and the wind power plant end of the HVDC transmission link 2 respectively.

The lower plot in the diagram shows the development in AC current level $I_{WPP\_A}$, $I_{WPP\_B}$, $I_{WPP\_C}$ for the three phases at the wind power plant side, i.e. measured at the point of common connection. As mentioned above, the wind turbines 4 will only feed balanced current into the collector network 11, so that the three phases of the current have essentially equal magnitudes.

Figure 5:
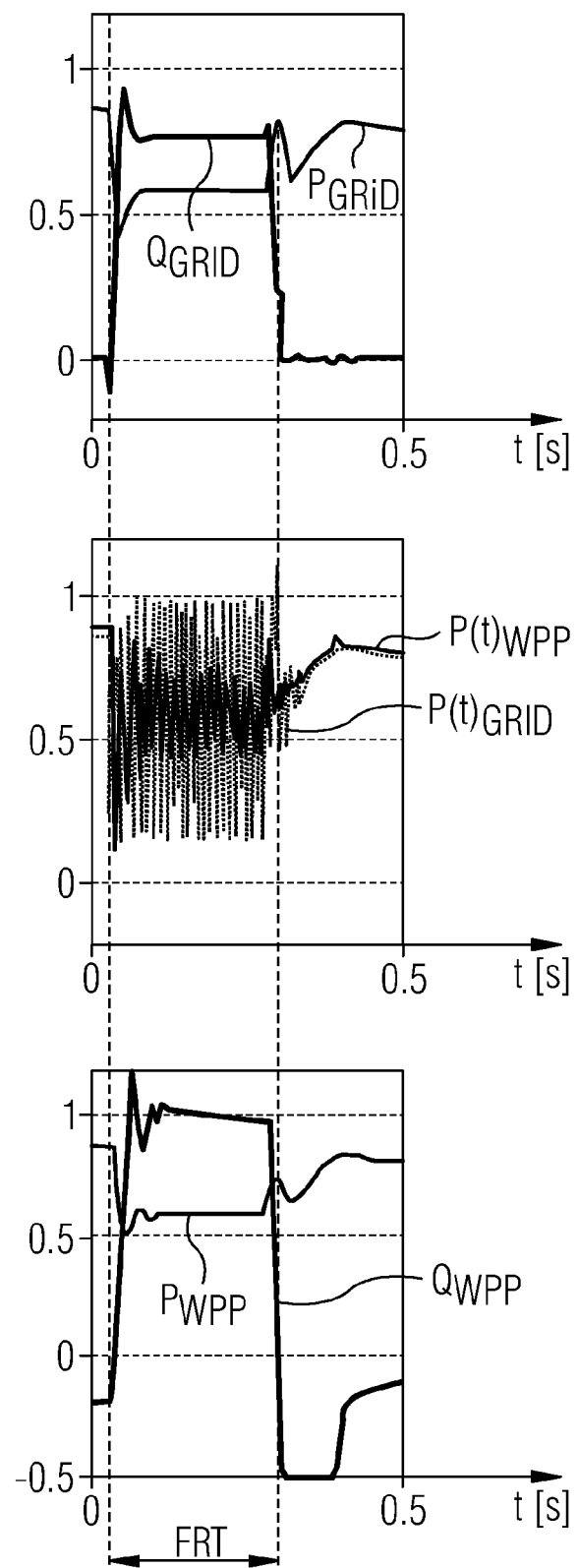

FIG. 5 shows graphs of active and reactive power during and after that asymmetrical grid-side fault (the time-scale along the X-axes is longer in this diagram). The upper plot in the diagram shows the development in mean active power $P_{GRID}$ and mean reactive power $Q_{GRID}$ at the grid side. The centre plot in the diagram shows instantaneous measurements of power $P(t)_{GRID}$, $P(t)_{WPP}$ over the HVDC transmission link, at the grid end and at the WPP end, respectively. The lower plot in the diagram shows the development in mean active power $P_{WPP}$ and mean reactive power $Q_{WPP\_B}$ measured at the point of common connection. These plots show that the method of control ensures that a power balance is maintained in the power generation and transmission system during an unbalanced single line-to-ground fault.

While specific embodiments have been described in detail, those with ordinary skill in the art will appreciate that various modifications and alternative to those details could be developed in light of the overall teachings of the disclosure. For example, the first converter could also be act to respond to an asymmetrical fault in the collector network, i.e. on the power plant side of the HVDC transmission link. Furthermore, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof.

It should be noted that the term "comprising" does not exclude other elements or steps and the use of articles "a" or "an" does not exclude a plurality. The mention of a "unit" or a "module" does not preclude the use of more than one unit or module.

The invention claimed is:

1. A method of controlling the power input to a high-voltage direct-current (HVDC) transmission link, the HVDC transmission link is connected to an alternating-current (AC) power plant via a first voltage source converter and to an AC grid via a second voltage source converter, the method comprising:

performing voltage control of the HVDC transmission link during a no-fault mode of operation of the grid via the second voltage source converter;

monitoring a HVDC transmission link parameter to detect an unbalanced fault;

regulating the output of the AC power plant via the first voltage source converter in the event of an unbalanced fault, which is on the basis of the monitored HVDC transmission link parameter; and wherein the regulating the output of the AC power plant comprises providing unbalanced multi-phase voltage reference signals at a collector network of the AC power plant; and wherein the unbalanced multi-phase AC voltage reference signals are comprised of three voltage signals of different magnitudes for the collector network of a three-phase AC power plant.

2. The method according to claim 1, wherein the unbalanced fault is detected when the monitored HVDC transmission link parameter exceeds a predefined threshold value.

3. The method according to claim 1, wherein the monitored HVDC transmission link parameter comprises a HVDC transmission link voltage.

4. A control module for controlling the power input to a high-voltage direct-current (HVDC) transmission link, the HVDC transmission link is connected to an AC power plant via a first voltage source converter and to a grid via a second voltage source converter, comprising:

a monitoring means for monitoring a HVDC transmission link parameter;
a detecting means for directly detecting an unbalanced fault on the basis of the monitored transmission link parameter;
a regulating means for regulating the output of the AC power plant according to the monitored HVDC transmission link parameter;
wherein the regulating means is realized to generate an unbalanced multi-phase AC voltage reference at a collector network of the AC power plant; and
wherein the unbalanced multi-phase AC voltage reference comprises three voltage signals of different magnitudes for the collector network of a three-phase AC power plant.

5. The control module according to claim 4, comprising:
a computer program product for carrying out the method according to claim 1, when the computer program product is loaded into a memory of a programmable device.

6. A voltage source converter for a power plant, comprising a control module according to any of claim 4.

7. A power generation and transmission arrangement, comprising:

an AC power plant for generating AC power;
an AC grid for consuming the generated AC power;
a high-voltage direct-current (HVDC) transmission link for transmitting the generated power from the AC power plant to the AC grid;
a first voltage source converter for converting AC power into DC power, arranged between a collector network of the AC power plant and the HVDC transmission link;
a second voltage source converter for converting DC power into AC power, arranged between the HVDC transmission link and the AC grid; and
a control module according to claim 4 for controlling the power input to the HVDC transmission link.

8. The power generation and transmission arrangement according to claim 7,
wherein the AC power plant comprises a wind power plant.

9. The power generation and transmission arrangement according to claim 8,
wherein the wind power plant comprises a number of variable-speed wind turbines realized to provide a balanced multi-phase current independent of a voltage imbalance.

* * * * *